US011122813B2

(12) United States Patent
Elster et al.

(10) Patent No.: US 11,122,813 B2
(45) Date of Patent: Sep. 21, 2021

(54) HIGH FAT HUMAN MILK PRODUCTS

(71) Applicant: Prolacta Bioscience, Inc., City of Industry, CA (US)

(72) Inventors: Scott Elster, City of Industry, CA (US); Joseph Fournell, City of Industry, CA (US); Scott Eaker, City of Industry, CA (US)

(73) Assignee: Prolacta Bioscience, Inc., City of Industry, CA (US)

(*) Notice: Subject to any disclaimer, the term of this patent is extended or adjusted under 35 U.S.C. 154(b) by 0 days.

(21) Appl. No.: 14/198,432

(22) Filed: Mar. 5, 2014

(65) Prior Publication Data

US 2014/0272027 A1 Sep. 18, 2014

Related U.S. Application Data

(60) Provisional application No. 61/779,781, filed on Mar. 13, 2013.

(51) Int. Cl.
*A23C 9/20* (2006.01)

(52) U.S. Cl.
CPC .................................. *A23C 9/206* (2013.01)

(58) Field of Classification Search
CPC .................................................. A23C 9/206
USPC ........................................ 426/580, 586, 801
See application file for complete search history.

(56) References Cited

U.S. PATENT DOCUMENTS

| | | |
|---|---|---|
| 2,567,898 A | 9/1951 | Staaff |
| 3,946,113 A | 3/1976 | Seiberling |
| 4,362,697 A | 12/1982 | Tabb et al. |
| 4,455,483 A | 6/1984 | Schonhuber |
| 4,762,822 A | 8/1988 | Ettinger |
| 4,772,262 A | 9/1988 | Grant et al. |
| 4,876,100 A | 10/1989 | Holm et al. |
| 4,948,599 A | 8/1990 | Sagara et al. |
| 5,064,674 A | 11/1991 | Girsh |
| 5,169,766 A | 12/1992 | Schuster et al. |
| 5,256,437 A | 10/1993 | Degen et al. |
| 5,303,598 A | 4/1994 | Binder |
| 5,334,822 A | 8/1994 | Sanford |
| 5,340,603 A | 8/1994 | Neylan et al. |
| 5,401,523 A | 3/1995 | Degen et al. |
| 5,492,938 A | 2/1996 | Kyle et al. |
| 5,505,955 A | 4/1996 | Petersen et al. |
| 5,541,065 A | 7/1996 | Erlich et al. |
| 5,576,040 A | 11/1996 | Moller et al. |
| 5,605,689 A | 2/1997 | Ammann |
| 5,616,483 A | 4/1997 | Bjursell et al. |
| 5,670,196 A | 9/1997 | Gregory |
| 5,683,733 A | 11/1997 | Krabsen et al. |
| 5,707,678 A | 1/1998 | Gregory |
| 5,972,337 A | 10/1999 | Ceriani et al. |
| 5,983,198 A | 11/1999 | Mowery |
| 6,004,288 A | 12/1999 | Hochstedler et al. |
| 6,017,511 A | 1/2000 | Wong et al. |
| 6,020,015 A | 2/2000 | Gaull |
| 6,056,978 A | 5/2000 | Beck et al. |
| 6,183,803 B1 | 2/2001 | Morcol et al. |
| 6,194,009 B1 | 2/2001 | Kamerel |
| 6,270,827 B1 | 8/2001 | Gaull et al. |
| 6,294,206 B1 | 9/2001 | Barrett-Reis et al. |
| 6,426,109 B1 | 7/2002 | Ehsani et al. |
| 6,613,367 B1 | 9/2003 | Wells et al. |
| 6,635,296 B1 | 10/2003 | Nissen et al. |
| 6,652,900 B2 | 11/2003 | Lindquist |
| 6,670,124 B1 | 12/2003 | Chow et al. |
| 6,737,096 B2 | 5/2004 | Lindquist |
| 6,780,987 B1 | 8/2004 | Herman et al. |
| 6,846,298 B1 | 1/2005 | Carr et al. |
| 6,910,594 B2 | 6/2005 | Foley et al. |
| 7,867,541 B2 | 1/2011 | McMahon et al. |
| 7,914,822 B2 | 3/2011 | Medo |
| 7,943,315 B2 | 5/2011 | Medo et al. |
| 7,951,410 B2 | 5/2011 | McMahon et al. |
| 8,278,046 B2 | 10/2012 | Medo et al. |
| 8,377,445 B2 | 2/2013 | Medo et al. |
| 8,545,920 B2 | 10/2013 | Medo et al. |
| 8,628,921 B2 | 1/2014 | Medo et al. |
| 8,821,878 B2 | 9/2014 | Medo et al. |
| 2001/0034614 A1 | 10/2001 | Fletcher-Haynes et al. |
| 2001/0049096 A1 | 12/2001 | Brown |
| 2002/0155445 A1 | 10/2002 | Jarvik |
| 2002/0182243 A1 | 12/2002 | Medo |
| 2003/0093171 A1 | 5/2003 | Soehnlen |
| 2003/0152942 A1 | 8/2003 | Fors et al. |

(Continued)

FOREIGN PATENT DOCUMENTS

| | | |
|---|---|---|
| CN | 101873806 A | 10/2010 |
| CN | 102511557 A | 6/2012 |

(Continued)

OTHER PUBLICATIONS

Intermountain Healthcare, Pasteurized Human Milk, Fact Sheet for Pateints and Families, 2010, pp. 1-2.*
Kim et al, Human Milk Banking, Nov. 2010, Paediatr Child Health, vol. 9, pp. 595-598.*
Hair et al., Randomized Trial of Human Milk Cream as a Supplement to Standard Fortification of an Exlcusive Human Milk-Based Diet in Infants 750-1250 g Birth Weight, 2014, The Journal of Pediatrics, vol. 165, No. 5, pp. 915-920.*
https://clinicaltrials.gov/ct2/show/study/NCT01487928?term=human+milk&cond=Premature&cntry=US&rank=5), Dec. 2011.*
Ballard et al, Human Milk Composition: Nutrients and Bioactive Factors, Pediatr Clin North Am. Feb. 2013 ; 60(1): 49-74. doi: 10.1016/j.pcl.2012.10.002.*

(Continued)

*Primary Examiner* — Leslie A Wong
(74) *Attorney, Agent, or Firm* — Cooley LLP

(57) ABSTRACT

The disclosure features a human milk cream composition as well as methods of making a human milk cream composition and using a human milk cream composition. In particular, the disclosure features a method of using a human milk cream composition to raise the caloric content of human milk.

3 Claims, No Drawings

(56) References Cited

U.S. PATENT DOCUMENTS

| | | |
|---|---|---|
| 2003/0175701 A1 | 9/2003 | Griffiths et al. |
| 2003/0219812 A1 | 11/2003 | Quay et al. |
| 2004/0181205 A1 | 9/2004 | Morton et al. |
| 2004/0265462 A1 | 12/2004 | Carlson |
| 2005/0053707 A1 | 3/2005 | Kopf et al. |
| 2005/0096295 A1 | 5/2005 | McMahon et al. |
| 2005/0100634 A1 | 5/2005 | Medo |
| 2005/0214358 A1 | 9/2005 | Mikoshiba et al. |
| 2005/0220894 A1 | 10/2005 | Williams et al. |
| 2006/0115558 A1 | 6/2006 | Lamothe |
| 2006/0204632 A1 | 9/2006 | Barrett Reis et al. |
| 2006/0233915 A1 | 10/2006 | Puski et al. |
| 2007/0098863 A1 | 5/2007 | Medo et al. |
| 2007/0104700 A1 | 5/2007 | Garcia-Rodenas et al. |
| 2007/0203802 A1 | 8/2007 | Medo et al. |
| 2008/0118615 A1 | 5/2008 | Hartmann et al. |
| 2008/0124430 A1 | 5/2008 | Medo et al. |
| 2008/0187619 A1 | 8/2008 | Hartmann et al. |
| 2008/0227101 A1 | 9/2008 | Medo et al. |
| 2008/0254165 A1 | 10/2008 | Patel et al. |
| 2008/0274230 A1 | 11/2008 | Johns et al. |
| 2009/0181848 A1 | 7/2009 | Lenz et al. |
| 2009/0203592 A1 | 8/2009 | Beermann et al. |
| 2009/0258121 A1 | 10/2009 | Medo |
| 2010/0268658 A1 | 10/2010 | Medo et al. |
| 2010/0280115 A1 | 11/2010 | Medo et al. |
| 2011/0206684 A1 | 8/2011 | Medo |
| 2011/0256233 A1 | 10/2011 | Fournell et al. |
| 2011/0256269 A1 | 10/2011 | Medo et al. |
| 2011/0311689 A1 | 12/2011 | Medo et al. |
| 2012/0171165 A1 | 7/2012 | Buck et al. |
| 2012/0238626 A1 | 9/2012 | Gibson et al. |
| 2013/0059050 A1 | 3/2013 | Fournell et al. |
| 2013/0059815 A1 | 3/2013 | Fournell et al. |
| 2013/0195989 A1 | 8/2013 | Medo et al. |
| 2014/0037787 A1 | 2/2014 | Haschke et al. |
| 2014/0271980 A1 | 9/2014 | Eaker et al. |
| 2014/0272027 A1 | 9/2014 | Elster et al. |
| 2017/0367364 A1 | 12/2017 | Lee et al. |

FOREIGN PATENT DOCUMENTS

| | | |
|---|---|---|
| EP | 1637043 | 3/2006 |
| GB | 1451747 A | 10/1976 |
| JP | 61-33895 U | 1/1986 |
| JP | 64-67141 A | 3/1989 |
| JP | 6-303900 A | 11/1994 |
| JP | 2001-017078 A | 1/2001 |
| JP | 2002-068998 A | 3/2002 |
| JP | 2002-532074 A | 10/2002 |
| JP | 2002-540806 A | 12/2002 |
| JP | 2005-525116 A | 8/2005 |
| JP | 2010-502186 A | 1/2010 |
| JP | 2010-126495 A | 6/2010 |
| JP | 2011-504365 A | 2/2011 |
| JP | 2011-172569 A | 9/2011 |
| JP | 2012-254091 A | 12/2012 |
| SE | 380422 B | 11/1975 |
| WO | WO 1998/57549 | 12/1998 |
| WO | WO-00/43550 | 7/2000 |
| WO | WO 2000/060949 A2 | 10/2000 |
| WO | WO 2005/013709 A1 | 2/2005 |
| WO | WO 2005/051088 A2 | 6/2005 |
| WO | WO 2005/084129 | 9/2005 |
| WO | WO 2006/026878 A1 | 3/2006 |
| WO | WO 2006/026879 | 3/2006 |
| WO | WO/2007/035870 | 3/2007 |
| WO | WO-2008/027572 | 3/2008 |
| WO | WO-2008/067486 | 6/2008 |
| WO | WO 2008/073888 A2 | 6/2008 |
| WO | WO 2008/119163 A1 | 10/2008 |
| WO | WO 2009/068549 A1 | 6/2009 |
| WO | WO 2010/030764 A2 | 3/2010 |
| WO | WO 2011/144221 A1 | 11/2011 |
| WO | WO 2014/158907 A1 | 10/2014 |
| WO | WO 2014/158911 A1 | 10/2014 |
| WO | WO 2016/109659 A1 | 7/2016 |
| WO | WO 2016/168698 A1 | 10/2016 |
| WO | WO 2017/117409 A1 | 7/2017 |

OTHER PUBLICATIONS

"International Search Report," 2 pages, PCT appl. No. PCT/US2012/049590 (dated Oct. 1, 2012).

"Written Opinion of the International Searching Authority," 6 pages, PCT appl. No. PCT/US2012/049590 (dated Oct. 1, 2012).

Arnold, "How North American Donor Banks Operate: Results of a Survey: Part 2," *J. Hum. Lact.*, 13(3):243-46, Sep. 1997.

Arnold, "How to Order Banked Donor Milk in the United States: What the Health Care Provider Needs to Know," J. Hum. Lact. 14(1):65-67 (1998).

Bernsahw, N.J., "Milk Banking: an Idea That Has Come of Age. Non-Profit Milk Banking," Seminar delivered at Utah Breastdeeding Coalition Meeting, Aug. 29, 2006.

Boehm, G., et al., "Metabolic Differences Between AGA- and SGA-Infants of Very Low Birthrate II Relationship to Protein Intake," Acta Paediatrics Scaninavica, Almquist, Och Wiksell, Stockholm, SE 77(5):642-646, Jan. 1, 1988.

Burger and Schumm, "Detection of a Minor contributor in a DNA Sample Mixture from Human Milk," *International Congress Series*, 1288:547-549, 2006.

Burger et al., "Detection of a 1% to 2% Contributor in a DNA Sample Mixture From Human Milk," International Society for Forensic Genetics 21$^{st}$ Congress Conference Programme and Abstracts [online], Sep. 12-17, 2005 [retrieved on Mar. 26, 2007]. Retrieved from the Internet: http://www.ipatimup.pt/isfg2005/PROGRAMME.pdf; p. 75.

Carey et al., "Growth and phosphorus metabolism in premature infants fed human milk, fortified human milk, or special premature formula. Use of serum procollagen as a marker of growth," Am. J. Dis. Children 141(5):511-515 (1987).

Casey, "The nutritive and metabolic advantages of homologous milk," Proc. Nutr. Soc. 48:271-281 (1989).

Cowan et al., "Milk permeate as a dietary supplement for lactating dairy cows," Aus. J. Exp. Agric. 30(6):807-810 (1990).

Davies, D. P., "Adequacy of Expressed Breast Milk for Early Growth of Preterm Infants," Arch. Disease in Childhood. 1977. vol. 52, pp. 296-301.

Friis and Andersen, "Rate of inactivation of cytomegalovirus in raw banked milk during storage at −20°C and pasteurisation," Br. Med. J. 285:1604-1605 (1982).

Fukushima et al., "Consumption of cow milk and egg by lactating women and the presence of β-lactoglobulin and ovalbumin in breast milk," Am. J. Clin. Nutr. 65:30-35 (1997).

Gartner et al., "Breastfeeding and the use of human milk," Pediatr. 115(2):496-506 (2005).

Geilman et al., "Production of an electrolyte beverage from milk permeate," J. Dairy Sci. 75(9):2364-2369 (1992).

Hagelberg S., et al., "Amino Acid Levels in the Critically Ill Preterm Infant Given Mother's Milk Fortified with Protein from Human or Cow's Milk" Acta Paediatr Scan.1990. vol. 79, pp. 1163-1174.

Hagelberg, S., et al., "The Protein Tolerance of Very Low Birth Weight Infants Fed Human Milk Protein Enriched Mothers' Milk" Acta Paediatr Scan. 1982. vol. 71, pp. 597-601.

Hartmann, B.T., et al. "Best Practice Guidelines for the Operation of a Donor Human Milk Bank in an Australian NICU," *Early Human Devel.* 83:667-673, 2007.

Hylmo, P., et al. "Preparation of Fat and Protein from Banked Human Milk: Its Use in Feeding Very-Low-Birth-Weight Infants," Human Milk Banking, edited by A.F. Williams and J.D. Baum, Nestle Nutrition, Vewey/Raven Press, New York, 1984, pp. 55-61.

Itabashi et al., "Fortified preterm human milk for very low birth weight infants," Early Hum. Devel. 29:339-343 (1992).

Jenness and Palmer, "Substances Adsorved on the Fat Globules in Cream and Their Relation to Churning. V. Composition of the 'Membrane' and Distribution of the Adsorbed Substances in Churning," *J. Dairy Science* 28(8):611-623, 1945.

(56) References Cited

OTHER PUBLICATIONS

Jensen et al., "Lipids of Bovine and Human Milks: A Comparison," *J Dairy Science* 73:223-40, 1990.
Jensen, R.G. et al., "Lipids in Human Milk and Infant Formulas," Annual Review of Nutrion, 12:417-441, Jul. 1, 1992.
Klein, Catherine, J., "Nutrient Requirements for Preterm Infant Formulas 123," Life Sciences Research Office, J Nutr 132:1935S-1577S, 2002.
Krukovsky et al., "The Effects of Nordihydroguaiaretic Acid, Salt, and Temperature of Storage on the Stability of Fat and Fat-Soluble Vitamins in Cream and Butter," *J Dairy Science*, 32(7):679-87, 1949.
Lapillione, et al., "Mineral balance and whole body bone mineral content in very low-birth-weight infants", (1994) Acta Pediatrica 84 (s405):117-122.
Lawrence, "Storage of human milk and the influence of procedures on immunological components of human milk," Acta Paediatr. 88:14-18 (1999).
Lindblad B.S., et al., "Blood Levels of Critical Amino Acids in Very Low Birthweight Infants on a High Human Milk Protein Intake" Acta Paediatr Scan.1982.vol. 296, pp. 24-27.
Lönnerdal, "Biochemistry and physiological function of human milk proteins," Am. J. Clin. Nutr. 42:1299-1317 (1985).
Lucas et al., "A human milk formula," Early Hum. Devel. 4/1:15-21 (1980).
Luck and Nau, "Nicotine and cotinine concentrations in the milk of smoking mothers: influence of cigarete consumption and diurnal variation," Eur J. Pediatr. 146:21-26 (1987).
McKiernan and Hull, "The Constituents of Neonatal Milk," Pediatr. Res. 16:60-64 (1982).
Melegh, et al., "Changes of Plasma Free Amino Acids and Renal Clearances of Carnitines in Premature Infants During L-Carnitine-Supplemented Human Milk Feeding", (1998) J. Pediatric Gastroenterol. Nutr. 7(3):424-429.
Moro et al., "Fortification of Human Milk: Evaluation of a Novel Fortification Scheme and of a New Fortifier," J. Ped. Gastroenterol. Nutr. 20:162-172 (1995).
Moro, G.E., et al., "Growth and Metabolic Responses in Low-Birth-Weight Infants Fed Human Milk Fortified with Human Milk Protein or with a Bovine Milk Protein Preparation," J. Pediatric Gastroenterol. and Nutr. 1991. vol. 13, pp. 150-154.
Ogundele,"Techniques for the storage of human breast milk: implications for anti-microbial functions and safety of stored milk," Eur. J. Pediatr. 159:793-797 (2000).
Panzer et al "Immune thrombocytopenia in severe hemophilia A treated with high-dose intravenous immunoglobulin," Transfusion 26:69-72 (1986).
PCT/US2006/036827 International Search Report and Written Opinion, 5 pages, dated Mar. 20, 2008.
PCT/US2007/019234 International Search Report and Written Opinion, 4 pages, dated Jan. 24, 2012.
PCT/US2007/085969 International Search Report and Written Opinion, 6 pages, dated May 29, 2009.
PCT/US2007/086973 International Search Report and Written Opinion, 6 pages, dated Jun. 8, 2009.
Polberger, S.K.T., "Fortified Human Milk for Very Low Birth Weight Infants: Effects on Growth and Metabolism," Dept. Pediatrics, University of Lund, Malmo 1990, pp. 1-148.
Polberger, S.K.T., et al., "Amino Acid Concentrations in Plasma and Urine in Very Low Birth Weight Infants Fed Non-Protein-Enriched or Human Milk Protein-Enriched Human Milk," Department of Pediatrics, University of Lund, Malmö General Hospital, S-21401 Malmö Sweden, pp. 131-148. Pediatrics 1990; 86: 909-915.
Polberger, S.K.T., et al., "Assessment of Eleven Different Plasma Proteins as Indicators of Protein Nutritional Status in Very Low Birth Weight Infants," Department of Pediatrics, University of Lund, Malmö General Hospital, S-21401 Malmö Sweden, 1990, pp. 115-129.
Polberger, S.K.T., et al., "Concentrations of Twelve Plasma Proteins at Birth in Very Low Birth Weight and in Term Infants," Department of Pediatrics, University of Lund, Malmö General Hospital, S-21401 Malmö Sweden, pp. 101-114. Acta Paediatr Scand. 1990; 79(8-9): 729-736.
Polberger, S.K.T., et al., "Growth of Very Low Birth Weight Infants on Varying Amounts of Human Milk Protein," Department of Pediatrics, University of Lund, Malmö General Hospital, S-21401 Malmö Sweden, pp. 69-87. Pediatr Res 1989; 25: 414-419.
Polberger, S.K.T., et al., "Urinary and Serum Urea as Indicators of Protein Metabolism in Very Low Birth Weight Infants Fed Varying Human Milk Protein Intakes," Department of Pediatrics, University of Lund, Malmö General Hospital, S-21401 Malmö Sweden, pp. 89-99. Acta Paediatr Scand. 1990; 79(8-9): 737-42.
Prentice, A., "Constituents of Human Milk," *Food and Nutrition Bulletin*, the United Nations University Press, 17(4), Dec. 1996.
Ronnholm, K.A.R., et al., "Human Milk Protein and Medium-Chain Triglyceride Oil Supplementation of Human Milk: Plasma Amino Acids in Very Low-Birth-Weight-Infants," Pediatrics, American Academy of Pediatrics, 74(5):792-799, Jan. 1, 1984.
Ronnholm, K., et al., "Supplementation with Human Milk Protein Improves Growth of Small Premature Infants Fed Human Milk," Pediatrics. 1986. vol. 77, No. 5, pp. 649-653.
Saiki et al., "Genetic analysis of amplified DNA with immobilized sequence-specific oligonucleotide probes," Proc. Natl. Acad. Sci. USA 86:6230-6234 (1989).
Salle, et al., "Effects of Calcium and Phosphorus Supplementation on Calcium Retention and Fat Absorption in Preterm Infants Fed Pooled Human Milk", (1986) J. Pediatric Gastroenterol. Nutr. 5(4):638-642.
Schanler et al., "Feeding strategies for premature infants: beneficial outcomes of feeding fortified human milk versus preterm formula," Pediatr. 103(6 Pt 1):1150-1157 (1999).
Schanler, R., et al., "Enhanced Fecal Excretion of Seleted Immune Factors in Very Low Birth Weight Infants Fed Fortified Human Milk," Pediatric Research. 1986. vol. 20, No. 8, pp. 711-715.
Schanler, R., et al., "Fortified Mothers' Milk for Very Low Birth Weight Infants; Results of Growth and Nutrient Balance Studies," J. Pediatrics. 1985. vol. 107, No. 3, pp. 437-444.
Schanler, R., et al., "Fortified Mothers' Milk for Very Low Birth Weight Infants: Results in Macromineral Balance Studies," J. Pediatrics. 1985. vol. 107, No. 5, pp. 767-774.
Schanler, R., et al., "Mineral Balance Studies in Very Low Birth Weight Infants Fed Human Milk," J. Pediatrics. 1988. vol. 113, vol. 1, Part 2, pp. 230-238.
Srinivasan, L., et al., "Increased Osmolality of Breast Milk with Therapeutic Additives," Arch Dis Child Fetal Neonatal Ed. 2004. 89:F514-17.
Supplementary European Search Report dated Oct. 15, 2010, in co-pending related European application No. EP 07 86 5463, 6 pages.
Supplementary European Search Report dated Apr. 20, 2011 in co-pending European application No. EP 07811645.6, 7 pages.
Supplementary European Search Report dated Apr. 27, 2011 in co-pending European application No. EP 07864921.7, 8 pages.
Supplementary European Search Report dated Mar. 24, 2009 in co-pending European application No. EP 06815100.0, 6 pages.
Supplementary European Search Report dated Oct. 29, 2012 in co-pending European application No. EP 09831061.8, 5 pages.
Terpstra, et al., "Antimicrobial and Antiviral Effect of High-Temperature Short-Time (HTST) Pasteurization Applied to Human Milk," Breastfeeding Med. 2007. vol. 2, pp. 27-33.
The Dairy Council, "The Nutritional Composition of Dairy Products," pp. 1-49, 2002.
Tully, "Is Pasteurized Mother's Own or Donor Milk an Answer to the HIV Crisis," J. Hum. Lact. 15(4):345-346 (1999).
Virus Safety Services, Sanquin Research, Final Report FR4500, "Process Validation Breast Milk Step 1 for Inactivation of BVDV/HAV/HIV/PSR," May 27, 2002, pp. 1-33.
Voyer, M., et al. "Human Milk Lacto-Engineering," Acta Paediatr Scan. 1984. vol. 73, pp. 302-306.
Williams et al., "Human Milk Banking," J. Trop. Pediatr. 31:185-190 (1985).
Young, "International Search Report," and "Written Opinion of the International Searching Authority," 11 pages, from International

(56) References Cited

OTHER PUBLICATIONS

Patent Application No. PCT/US09/66430, United States Patent and Trademark Office, Alexandria, Virginia, USA (dated Jan. 26, 2010).
"Breastfeeding and the use of human milk." American Academy of Pediatrics, Pediatrics (2012); 129(3): e827-e841.
Aoyama, Kazutoshi, et al. "Improved outcome of allogeneic bone marrow transplantation due to breastfeeding-induced tolerance to maternal antigens." Blood (2009); 113.8: 1829-1833.
Arnold, "How North American Donor Banks Operate: Results of a Survey: Part 1," J. Hum. Lact (1997); 13(2):159-162.
Atkinson, et al., "Special nutritional needs of infants for prevention of and recovery from bronchopulmonary dysplasia." J Nutr. (2001); 131(3): 942S-946S.
Baveja, et al., "Pharmacological strategies in the prevention and management of bronchopulmonary dysplasia." Semin Perinatol. (2006); 30(4): 209-218.
Biniwale, et al., "The role of nutrition in the prevention and management of bronchopulmonary dysplasia." Semin Perinatol. (2006); 30(4): 200-208.
Bode, Lars, and Jantscher-Krenn, Evelyn. "Structure-function relationships of human milk oligosaccharides." Advances in Nutrition: An International Review Journal (2012); 3.3: 383S-391S.
Cabre et al., "Polyunsaturated Fatty Acid Deficiency in Liver Cirrhosis: Its Relation to Associated Protein-Energy Malnutrition (Preliminary Report).", American Journal of Gastroenterology, 83(7): 712-717 (1988). (Abstract).
Coxson, et al., "Early emphysema in patients with anorexia nervosa." Am J Respir Crit Care Med. (2004); 170(7): 748-752.
Cristofalo et al. "Randomized trial of exclusive human milk versus preterm formula diets in extremely premature infants." Journal of Pediatrics (2013); 163.6: 1592-1595.
De Halleux, et al., "Variability in human milk composition: benefit of individualized fortification in very-low-birth-weight infants." Am J Clin Nutr. (2013); 98(2): 529S-35S.
duckduckgosling: "Breastmilk Ice Cream!!", youtube, Apr. 11, 2012 (Apr. 11, 2012), p. 2 pp., XP054976962, Retrieved from the Internet: URL:www.youtube.com/watch?v=yMoJhJYvmYQ [retrieved on Dec. 1, 2016] * the whole document*.
Ehrenkranz, et al., "Early, aggressive nutritional management for very low birth weight infants: what is the evidence?." Semin Perinatol. (2007); 31(2): 48-55.
Ehrenkranz, et al., "Ongoing issues in the intensive care for the periviable infant—nutritional management and prevention of bronchopulmonary dysplasia and nosocomial infectionsk." Semin Perinatol. (2014); 38(1): 25-30.
Extended European Search Report in EP Application No. EP 12188676.6 dated Feb. 27, 2013.
Extended European Search Report in EP Application No. EP 14774486.6 dated Dec. 9, 2016, 10 pages.
Hair, et al., "Randomized trial of human milk cream as a supplement to standard fortification of an exclusive human milk-based diet in infants 750-1250 g birth weight." J Pediatr. (2014); 165(5): 915-920.
Hair et al., "Premature Infants 750-1,250 g Birth Weight Supplemented with a Novel Human Milk-Derived Cream Are Discharged Sooner." Breastfeeding Medicine (2016); 11(3): 133-137.
Hawthorne, et al., "Current issues in nutritional management of very low birth weight infants." Minerva Pediatr. (2004); 56(4): 359-372.
Jiaxiang, Zhang, et al., People's Medical Publishing House, p. 181, Dec. 2006, with English translation, 4 pages.
Jobe, et al., "Let's feed the preterm lung." J Pediatr (Rio J) (2006); 82(3): 165-166.
Johnson, et al., "Cost of morbidities in very low birth weight infants." J Pediatr. (2013); 162(2): 243-249.e1.
Kuschel and Harding, "Fat supplementation of human milk for promoting growth in preterm infants." Cochrane Database of Systematic Reviews (2007); Issue 4, DOI: 10.1002/14651858.CD000341.
Lake, Frank, "Breast Milk Ice Cream: Weekly World News", Feb. 25, 2011 (Feb. 25, 2011), XP055324916, Retrieved from the Internet: URL:http://weeklyworldnews.com/headlines/29979/breast-milk-ice-cream/[retrieved on Nov. 30, 2016] * the whole document*.
Massaro, et al., "Hunger disease and pulmonary alveoli." Am J Respir Crit Care Med. (2004); 170(7): 723-724.
Massaro, et al., "Lung alveoli: endogenous programmed destruction and regeneration." Am J Physiol Lung Cell Mol Physiol. (2002); 283(2): L305-9.
Mataloun, et al., "Pulmonary responses to nutritional restriction and hyperoxia in premature rabbits." J Pediatr (Rio J). (2006); 82(3): 179-185.
Mendenhall et al., "Protein-calorie malnutrition associated with alcoholic hepatitis", The American Journal of Medicine, 76(2): 211-222 (1984).
Mendenhall et al., "VA cooperative study on alcoholic hepatitis. II: Prognostic significance of protein-calorie malnutrition", Am J Clin Nutr, 43(2): 213-218 (1986).
Morgan et al., "Nutrition in cryptogenic cirrhosis and chronic aggressive hepatitis", Gut, 17: 113-118 (1976).
Morrow, et al., "Human milk oligosaccharides are associated with protection against diarrhea in breast-fed infants." The Journal of Pediatrics (2004); 145(3): 297-303.
Muscaritoli, Maurizio, et al. "Clinical and metabolic effects of different parenteral nutrition regimens in patients undergoing allogeneic bone marrow transplantation." Transplantation (1998); 66.5: 610-616.
Oh, et al., "Neonatal Research Network: Association between fluid intake and weight loss during the first ten days of life and risk of bronchopulmonary dysplasia in extremely low birth weight infants." J Pediatr. (2005); 147(6): 786-790.
O'Keefe et al., "Malnutrition and immuno-incompetence in patients with liver disease", Lancet, 316(8195): 615-617 (1980). Originally published as vol. 2, Issue 8195.).
Palombo et al., "Effectiveness of orthotopic liver transplantation on the restoration of cholesterol metabolism in patients with end-stage liver disease", Gastroenterology, 93(6): 1170-1177 (1987).
PCT/US2007/086973 International Preliminary Report on Patentability, dated Jun. 10, 2009, 7 pages.
PCT/US2014/020837, International Preliminary Report on Patentability dated Sep. 15, 2015, 6 pages.
PCT/US2014/020837, International Search Report and Written Opinion dated Jun. 10, 2014, 7 pages.
PCT/US2015/068050, International Search Report and Written Opinion dated Mar. 4, 2016, 10 pages.
PCT/US2015/068050, International Preliminary Report on Patentability dated Jul. 4, 2017, 9 pages.
PCT/US2016/027893, International Search Report and Written Opinion dated Jul. 15, 2016, 11 pages.
PCT/US2016/069250, International Search Report and Written Opinion dated Mar. 30, 2017, 15 pages.
Rüdiger, et al., "Preterm infants with high polyunsaturated fatty acid and plasmalogen content in tracheal aspirates develop bronchopulmonary dysplasia less often." Crit Care Med. (2000); 28(5): 1572-1577.
Russell, et al., "Cost of hospitalization for preterm and low birth weight infants in the United States." Pediatrics (2007); 120(1): e1-9.
Schanler, et al., "Outcomes of human milk-fed premature infants." Semin Perinatal (2011); 35(1): p. 29-33.
Sears, Martha, et al., "The Breastfeeding Book", Jiangsu Literature and Art Publishing House, pp. 242-245, Jan. 2011, with English translation, 6 pages.
Sullivan, et al.., "An exclusively human milk-based diet is associated with a lower rate of necrotizing enterocolitis than a diet of human milk and bovine milk-based product.". J Pediatr. (2010); 156(4):562-567.e1.
Theile, et al., "Nutritional strategies and growth in extremely low birth weight infants with bronchopulmonary dysplasia over the past 10 years." J Perinatol. (2012); 32(2): 117-122.
Vieira, et al., "Analysis of the influence of pasteurization, freezing/thawing, and offer processes on human milk's macronutrient concentrations." Early Hum Dev. (2011); 87(8): 577-580.
Wemhöner, et al., "Nutrition of preterm infants in relation to bronchopulmonary dysplasia." BMC Pulm Med. (2011); 11:7.
Wojcik, et al., "Macronutrient analysis of a nationwide sample of donor breast milk." J Am Diet Assoc. (2009); 109(1): 137-140.

(56) References Cited

OTHER PUBLICATIONS

Yunghans, Regina, "8 Alternative Uses for Breastmilk-alternative-uses-for-breastm", Jul. 8, 2011 (Jul. 8, 2011), XP055325257, Retrieved from the Internet: URL:http://www.thekitchn.com/8-alternative-uses-for-breastm-150830 [retrieved on Dec. 1, 2016] * the whole document *.

Zimmerman, Edith, "But What Does Breastmilk Cheese Taste Like?" Jan. 18, 2011 (Jan. 18, 2011), pp. 1-3, XP055324917, Retrieved from the Internet: URL:https://thehairpin.com/but-what-does-breastmilk-cheese-taste-like-3df200ea554b#.qkxr5lv8e [retrieved on Nov. 30, 2016] * the whole document*.

Extended European Search Report for European Patent Application No. 20216091.7 dated Mar. 29, 2021, 11 pages.

Ireton-Jones, Carol S., "Intake: Energy". In: Krause's and Mahan's Food & The Nutrition Care Process, (eds.) Janice L. Raymond and Kelly Morrow, 15th Edition (2021); Chapter 2, pp. 17-27, 14 pages.

Kuschel, et al., "Fat supplementation of human milk for promoting growth in preterm infants." Cochrane Database of Systematic Reviews (Apr. 24, 2000); 3 pages, DOI: 10.1002/14651858. CD000341, www.cochranelibrary.com/cdsr/doi/10.1002/14651858. CD000341/full.

Polberger, S.K.T., et al., "Growth of Very Low Birth Weight Infants on Varying Amounts of Human Milk Protein," Pediatric Research (1989); 25(4): 414-419.

Prolact Cr® label, Human Milk Caloric Fortifier (Human, Pasteurized), 10 mL, Prolacta Bioscience, Inc., California, USA (2018), 2 pages.

[Author Unknown] "Incidence and Prevalence", Advanced Renal Education (2012); pp. 1-2, advancedrenaleducation.com/content/incidence-and-prevalence.

[Author Unknown], "Neonatal Parenteral Nutrition", UCSF Children's Hospital, Intensive Care Nursery House Staff Manual, 2004-2006, The Regents of the University of California; pp. 136-142, 7 pages.

[Author Unknown], Nutrients Unit Preterm Human Milk Alone Prolact +4 Preterm Human Milk Fortified With (Prolacta+4 H2MF® Nutrition Information; Prolact+6 H2MF® Nutrition Information, Prolact+8 H2MF® Nutrition Information; and Prolact+10 H2MF® Nutrition Information), Jan. 1, 2014 (Jan. 1, 2014), pp. 1-4, XP055710450, Retrieved from the Internet: URL:http://web.archive.org/web/20150909231449if_/http://www.prolacta.com/Data/Sites/14/media/PDF/mkt-180-prolact-hmf-nutritionlabels.pdf [retrieved on Jul. 1, 2020].

Abrams, et al., "Greater Mortality and Morbidity in Extremely Preterm Infants Fed a Diet Containing Cow Milk Protein Products." Breastfeeding Medicine (2014); 9 (6): 281-285.

Anderson, et al., "Variation in Growth of Infants with a Single Ventricle." The Journal of Pediatrics (2012); 161 (1): 16-21. e3.

Arnold, Human Milk in the NICU. Policy Into Practice. (2010); pp. 3-11, pp. 15-46; pp. 191-207; pp. 311-367, 121 pages.

Arslanoglu, et al., "Optimization of human milk fortification for preterm infants: new concepts and recommendations". J Perinat Med. (May 2010); 38(3): 233-238.

Database Medline [Online] US National Library of Medicine (NLM), Bethesda, MD, US; Jul. 1979 (Jul. 1979), Jenness R: "The composition of human milk." Database accession No. NLM392766, XP002785943, 2 pages.

Edmond and Bahl, "Optimal feeding of low-birth-weight infants." World Health Organization (2006); pp. 1-121, 131 pages.

Ganapathy, "Long term healthcare costs of infants who survived neonatal necrotizing enterocolitis: a retrospective longitudinal study among infants enrolled in Texas Medicaid". BMC Pediatrics (Aug. 20, 2013); 13: 127, 11 pages.

Ghandehari, et al., "An exclusive human milk-based diet in extremely premature infants reduces the probability of remaining on total parenteral nutrition: a reanalysis of the data". BMC Res Notes (Apr. 25, 2012); 5:188.

Hair, et al., "Human milk feeding supports adequate growth in infants < 1250 grams birth weight." BMC Research Notes (2013); 6(1): 459.

Heiman and Schanler, "Benefits of maternal and donor human milk for premature infants." Early Human Development (2006); 82 (12): 781-787.

Herrmann and Carroll, "An Exclusively Human Milk Diet Reduces Necrotizing Enterocolitis". Breastfeeding Medicine (May 1, 2014); 9(4): 184-190.

Hicks, et al., "Calcium Absorption in Very Low Birth Weight Infants with and without Bronchopulmonary Dysplasia". The Journal of Pediatrics (Jun. 2011); 158(6): 885-890.e1. Epub Feb. 6, 2011.

Huston, et al., "Decreasing Necrotizing Enterocolitis and Gastrointestinal Bleeding in the Neonatal Intensive Care Unit: The Role of Donor Human Milk and Exclusive Human Milk Diets in Infants <1500 g Birth Weight". ICAN: Infant, Child, & Adolescent Nutrition (Jan. 10, 2014); 6(2): 86-93.

Jacobs, et al., "An empirically based tool for analyzing morbidity associated with operations for congenital heart disease." The Journal of Thoracic and Cardiovascular Surgery (2013); 145 (4): 1046-1057. e1.

Jenq, et al., "Regulation of intestinal inflammation by microbiota following allogeneic bone marrow transplantation." J Exp Med. (May 7, 2012); 209(5): 903-911.

Kornhauser and Schneiderman, "How Plans Can Improve Outcomes And Cut Costs for Preterm Infant Care." Managed Care (Jan. 2010); 19(1): 28-30.

Kuzma-O'reilly, B., et al., "Evaluation, Development, and Implementation of Potentially Better Practices in Neonatal Intensive Care Nutrition." Pediatrics (2003); 111 (4): e461-e470, 12 pages.

Lucas and Cole, "Medical Science". The Lancet (1980); 336(8730-8731): 1519-1523.

Lucas, et al., "Breast milk and subsequent intelligence quotient in children born preterm". The Lancet (Feb. 1, 1992); 339(8788): 261-264.

Lucas, et al., "Randomised trial of early diet in preterm babies and later intelligence quotient". BMJ (Nov. 2, 19988); 317(7171): 1481-1487.

Masumoto, et al., "Nutritional management in neonatal patients." Parenteral and Enteral Nutrition (2012); 27 (5): 1195-1201 (and English translation of pertinent portion(s)).

Pham and Lawley, "Emerging insights on intestinal dysbiosis during bacterial infections." Current Opinion in Microbiology (2014); 17: 67-74. Epub Dec. 29, 2013.

Pietz, J., et al., "Prevention of Necrotizing Enterocolitis in Preterm Infants: A 20-Year Experience." Pediatrics (2007); 119 (1): e164-e170, 9 pages.

Rechtman, et al., "Effect of Environmental Conditions on Unpasteurized Donor Human Milk". Breastfeeding Medicine (2006 Spring); 1(1): 24-26.

Reeves, et al., "TGF-β2, a Protective Intestinal Cytokine, Is Abundant in Maternal Human Milk and Human-Derived Fortifiers but Not in Donor Human Milk". Breastfeeding Medicine (Dec. 2013); 8(6): 496-502. Epub Jul. 19, 2013.

Schanler, "Mother's Own Milk, Donor Human Milk, and Preterm Formulas in the Feeding of Extremely Premature Infants." Journal of Pediatric Gastroenterology and Nutrition (2007); 45 (Suppl 3): S175-S177.

Schanler, et al., "Randomized Trial of Donor Human Milk Versus Preterm Formula as Substitutes for Mothers' Own Milk in the Feeding of Extremely Premature Infants". Pediatrics (Aug. 2005); 116(2): 400-406.

Wight, N.E., et al., Best Medicine: Human Milk in the NICU (2008); p. xi-xiv, pp. 1-7, pp. 9-32, pp. 43-96, 91 pages.

[Author Unknown], Fifth Revised and Enlarged Edition, Standard Tables of Food Composition in Japan, Oct. 10, 2009, Second edition, Third printing, pp. 188-193 (with portions in English language), 7 pages.

* cited by examiner

HIGH FAT HUMAN MILK PRODUCTS

CROSS REFERENCE TO RELATED APPLICATIONS

This application claims priority to U.S. Provisional Application No. 61/779,781, filed Mar. 13, 2013, the contents of which are hereby incorporated by reference in its entirety.

FIELD OF THE INVENTION

The present disclosure relates generally to high fat human milk products, such as standardized human cream compositions, methods of producing the compositions, and methods of using the compositions.

BACKGROUND OF THE INVENTION

Human breast milk is considered the nutrition of choice for infants, including those in the neonatal intensive care unit (NICU) (American Academy of Pediatrics, Section on Breastfeeding. Breastfeeding and the Use of Human Milk. Pediatrics, 115:496-506, 2005). Typically, the human milk used in the NICU is from the baby's own mother, but it may also come from a donor. In the case of very-low birth weight (VLBW) infants, the milk is often supplemented with a human milk fortifier in order to provide the extra nutrition that these babies need.

While human milk is rarely analyzed for nutritional content, it has generally been assumed that human milk contains approximately 20 kcal/oz. However, Wojcik et al. (*J Am Diet Assoc*, 109:137-140, 2009) showed that this is often not the case with 25% of samples from a survey of 415 human breast milk donation samples having below 17.3 kcal/oz and 65% of the samples having below 20 kcal/oz. As a result, the expected energy and nutrient content is not achieved a significant percentage of the time. The net result is that the infant does not obtain the desired growth pattern, particularly with regard to weight. Current solutions to this problem include intravenous feeding of infants through the process of total parenteral nutrition (TPN). While TPN is effective at delivering the required level of nutrition to VLBW infants, it is also associated with many negative side effects including, for example, liver damage.

Thus, a solution is needed to solve the problem of low calorie human milk production that avoids the unwanted harmful side effects of TPN. The current invention solves the problem by providing a pasteurized, high fat human milk product that can be administered enterally and increase the caloric content of human milk while not substantially increasing the overall volume fed to the infant.

SUMMARY OF THE INVENTION

This disclosure features high fat human milk products, e.g., human cream compositions, as well as methods of making and methods of using the high fat human milk products.

In one aspect, the disclosure features a human milk cream composition comprising pasteurized cream derived from human milk, wherein the composition comprises about 2.5 kcal/ml. In one embodiment, the composition comprises about 25% fat. In another embodiment, the human cream composition further comprises human skim milk permeate. In yet another embodiment, the human cream composition further comprises deionized water.

In one embodiment, the composition is used for enteral nutrition. In a particular embodiment, the enteral nutrition is for a low birth weight infant.

In another aspect, the disclosure features a method of making a human milk cream composition comprising the steps of: obtaining a pool of human milk, separating the pool of human milk into a cream portion and a skim milk portion, formulating the cream portion to obtain a cream composition comprising about 2.5 kcal/ml, and pasteurizing the cream composition. In one embodiment, the separating step is via ultracentrifugation.

In one embodiment, the method of making a human milk cream composition further comprises ultra filtering water from the skim milk portion, thereby obtaining a human skim milk permeate. In a related embodiment, the formulating step comprises adding a volume of the human skim milk permeate to the cream portion. In another embodiment, the formulating step comprises adding a volume of deionized water to the cream portion.

In yet another embodiment, the method of making a human milk cream composition further comprises a step of testing the pool of human milk for adulterants, contaminants, drugs and/or pathogens. In one embodiment, the testing step comprises testing using a microorganism panel. In another embodiment, the testing step comprises PCR analysis for HIV, HBV and HCV. In one embodiment, the testing step detects bovine protein. In yet another embodiment, the testing step comprises testing for one or more drugs. In a related embodiment, the one or more drugs are selected from amphetamines, benzodiazepine, cocaine, methamphetamines, opiates, synthetic opioids (e.g. oxycodone/oxymorphone), THC, and principle metabolites thereof.

In one embodiment of the method, the pool of human milk is from one or more donors.

In a another aspect, the disclosure features a method of increasing the caloric content of human milk to a desired caloric content level, comprising the steps of: obtaining a sample of human milk, measuring the caloric content of the human milk, determining a volume of a human milk cream composition needed to raise the caloric content of the human milk to the desired caloric content level, and adding the volume of the human milk cream composition to the container of human milk. In one embodiment, the desired caloric content is 20 kcal/oz.

In one embodiment of the method of increasing the caloric content of human milk, the human milk cream composition comprises about 2.5 kcal/ml. In a related embodiment, the human milk cream composition comprises about 25% fat.

In another embodiment of the method, the human milk is for enteral nutrition. In a related embodiment, the enteral nutrition is for a low birth weight infant.

DETAILED DESCRIPTION OF THE INVENTION

The compositions and methods featured herein relate to human milk cream products. The rationale behind supplementing human milk (e.g., mother's or donor) stems from the finding that milk from mothers who deliver significantly prematurely does not have adequate nutritional content to completely meet the increased metabolic and growth needs of their infants relative to a full-term infant (Hawthorne et al., *Minerva Pediatr,* 56:359-372, 2004; Lawrence and Lawrence, Breastfeeding: A Guide for the Medical Profession, 6$^{th}$ edition. Philadelphia: Elsevier Mosby, 2005; and Ziegler, Human Milk for the Preterm Infant, International Congress of the Human Milk Banking Association of North America. Alexandria, Va., 2005).

Interestingly, so called "pre-term milk" may contain higher levels of protein than milk from a mother who has delivered at term (Hawthorne et al., *Minerva Pediatr,* 56:359-372, 2004; Lawrence and Lawrence, Breastfeeding: A Guide for the Medical Profession, 6$^{th}$ edition. Philadelphia: Elsevier Mosby, 2005; and Ziegler, Human Milk for the Preterm Infant, International Congress of the Human Milk Banking Association of North America. Alexandria, Va., 2005). Yet, these levels are still inadequate to ensure appropriate initial levels of growth and development and beyond, particularly in infants of a size destined not to survive in the days before neonatal intensive care. It is also the case that these elevated nutrition levels are relatively short-lived, and the "pre-term milk" rapidly becomes indistinguishable from term milk. Thus, it is critical that the nutritional content of the daily feedings for these infants meet acceptable levels of key components such as calories and protein.

However, the caloric content of the human milk supplied to infants is very rarely measured. As demonstrated by the study performed by Wocjik et al. (*J Am Diet Assoc,* 109: 137-140, 2009), it is likely that the human milk being supplied to LBW and VLBW infants is often not providing a sufficient amount of calories to meet the nutritional needs of a pre-term infant. The high fat human milk compositions described herein provide a solution to this problem and may be used, e.g., to supplement human milk in order to increase the caloric content to the desired level without increasing the volume to be fed to the infant, e.g., a LBW infant. This is particularly useful when all that is needed is increased caloric intake and not increased protein content. The compositions of the current invention solve this problem by increasing calories without increasing protein and therefore provide a more cost effective solution to the problem.

Total parenteral nutrition (TPN), a process of providing nutrition intravenously and bypassing the gastrointestinal tract, is often used to feed LBW infants. However, TPN is associated with several potential complications including, e.g., hyperglycemia, hypoglycemia, lipogenesis, hepatic complications (e.g., fatty liver and cholestasis), sepsis, and blood clots. In particular, the high fat and high protein requirements of the LBW infant tend to result in liver dysfunction when the nutrition is received parenterally. Accordingly, it is desirable to provide an infant with enteral nutrition as soon as possible rather than TPN, in order to avoid the negative effects associated with TPN. The high fat human milk compositions described herein can be used to increase the caloric content and fat content of human milk, thereby providing means for enteral delivery of human milk fat. Maintaining a fully human milk based diet reduces the incidence of complications such as necrotizing enterocolitis, and therefore, it is contemplated that enteral feeds of human milk supplemented with high fat human milk products may be used in place of TPN.

The terms "premature," "preterm," and "low-birth-weight (LBW)" infants are used interchangeably and refer to infants born less than 37 weeks gestational age and/or with birth weights less than 2500 g. In particular, the term "very-low-birth-weight (VLBW)" infant refers to an infant with a birth weight of 1250 g or less. Accordingly, the term "LBW infants" includes VLBW infants.

The term "whole milk" refers to human milk from which no fat has been removed.

By "bioburden" is meant microbiological contaminants and pathogens (generally living) that can be present in milk, e.g., viruses, bacteria, mold, fungus and the like.

All patents, patent applications, and references cited herein are incorporated in their entireties by reference. Unless defined otherwise, technical and scientific terms used herein have the same meaning as that commonly understood by one of skill in the art.

Human Cream Compositions

The high fat human milk compositions, or human cream compositions, described herein are produced from whole human milk. In one embodiment, the human cream composition comprises about 2.0 kcal to about 3.0 kcal or more per ml. In a preferred embodiment, the human cream composition comprises about 2.5 kcal/ml. It is contemplated that the human cream composition may comprise about 18% to about 30% or more fat (i.e., lipids). In one embodiment, the human cream composition is about 25% fat.

It is contemplated that the human cream compositions described herein may comprise one or more additional components in order to have the desired caloric content and/or desired percentage of fat. Accordingly, in one embodiment, the human cream composition comprises added human skim milk permeate. The skim milk permeate ("permeate") is the liquid produced by the ultrafiltration of human skim milk traditionally thought to be a waste product in the manufacture of human milk fortifers. In another embodiment, the human cream composition comprises deionized (DI) water in addition to high fat human milk.

Generally, the human cream composition is frozen for storage and/or shipment and is thawed prior to use.

Methods of Making Human Cream Compositions

The human cream compositions described herein are produced from whole human milk. The human milk may be obtained from an infant's own mother or from one or more donors. In certain embodiments, the human milk is pooled to provide a pool of human milk. For example, a pool of human milk comprises milk from two or more (e.g., ten or more) donors. As another example, a pool of human milk comprises two or more donations from one donor.

Obtaining Donor Milk

Generally, human milk is provided by donors, and the donors are pre-screened and approved before any milk is processed. Various techniques are used to identify and qualify suitable donors. A potential donor must obtain a release from her physician and her child's pediatrician as part of the approval process. This helps to insure, inter alia, that the donor is not chronically ill and that her child will not suffer as a result of the donation(s). Methods and systems for qualifying and monitoring milk collection and distribution are described, e.g., in U.S. patent application Ser. No. 12/728,811 (U.S. 2010/0268658), which is incorporated herein by reference in its entirety. Donors may or may not be compensated for their donation.

Usually, donor screening includes a comprehensive lifestyle and medical history questionnaire that includes an evaluation of prescription and non-prescription medications, testing for drugs of abuse, and testing for certain pathogens. The donor may be screened for, e.g., human immunodeficiency virus Type 1 (HIV-1), HIV-2, human T-lymphotropic virus Type 1 (HTLV-I), HTLV-II, hepatitis B virus (HBV), hepatitis C virus (HCV), and syphilis.

Donors may be periodically requalified. For example, a donor is required to undergo screening by the protocol used in their initial qualification every four months, if the donor wishes to continue to donate. A donor who does not requalify or fails qualification is deferred until such time as they do, or permanently deferred if warranted by the results of requalification screening. In the event of the latter situation, all remaining milk provided by that donor is removed from inventory and destroyed or used for research purposes only.

A donor may donate at a designated facility (e.g., a milk bank office) or, in a preferred embodiment, express milk at home. If the donor will be expressing milk at home, she will measure the temperature in her freezer with, e.g., a supplied thermometer to confirm that it is cold enough to store human milk in order to be approved.

Testing Donor Identity

Once the donor has been approved, donor identity matching may be performed on donated human milk because the milk may be expressed by a donor at her home and not collected at a milk banking facility. In a particular embodiment, each donor's milk can be sampled for genetic markers, e.g., DNA markers, to guarantee that the milk is truly from the approved donor. Such subject identification techniques are known in the art (see, e.g., International Application Serial No. PCT/US2006/36827, which is incorporated herein by reference in its entirety). The milk may be stored (e.g., at −20° C. or colder) and quarantined until the test results are received.

For example, the methods featured herein may include a step for obtaining a biological reference sample from a potential human breast milk donor. Such sample may be obtained by methods known in the art such as, but not limited to, a cheek swab sample of cells, or a drawn blood sample, milk, saliva, hair roots, or other convenient tissue. Samples of reference donor nucleic acids (e.g., genomic DNA) can be isolated from any convenient biological sample including, but not limited to, milk, saliva, buccal cells, hair roots, blood, and any other suitable cell or tissue sample with intact interphase nuclei or metaphase cells. The sample is labeled with a unique reference number. The sample can be analyzed at or around the time of obtaining the sample for one or more markers that can identify the potential donor. Results of the analysis can be stored, e.g., on a computer-readable medium. Alternatively, or in addition, the sample can be stored and analyzed for identifying markers at a later time.

It is contemplated that the biological reference sample may be DNA typed by methods known in the art such as STR analysis of STR loci, HLA analysis of HLA loci or multiple gene analysis of individual genes/alleles. The DNA-type profile of the reference sample is recorded and stored, e.g., on a computer-readable medium.

It is further contemplated that the biological reference sample may be tested for self-antigens using antibodies known in the art or other methods to determine a self-antigen profile. The antigen (or another peptide) profile can be recorded and stored, e.g., on a computer-readable medium.

A test sample of human milk is taken for identification of one or more identity markers. The sample of the donated human milk is analyzed for the same marker or markers as the donor's reference sample. The marker profiles of the reference biological sample and of the donated milk are compared. The match between the markers (and lack of any additional unmatched markers) would indicate that the donated milk comes from the same individual as the one who donated the reference sample. Lack of a match (or presence of additional unmatched markers) would indicate that the donated milk either comes from a non-tested donor or has been contaminated with fluid from a non-tested donor.

The donated human milk sample and the donated reference biological sample can be tested for more than one marker. For example, each sample can be tested for multiple DNA markers and/or peptide markers. Both samples, however, need to be tested for at least some of the same markers in order to compare the markers from each sample.

Thus, the reference sample and the donated human milk sample may be tested for the presence of differing identity marker profiles. If there are no identity marker profiles other than the identity marker profile from the expected subject, it generally indicates that there was no fluid (e.g., milk) from other humans or animals contaminating the donated human milk. If there are signals other than the expected signal for that subject, the results are indicative of contamination. Such contamination will result in the milk failing the testing.

The testing of the reference sample and of the donated human milk can be carried out at the donation facility and/or milk processing facility. The results of the reference sample tests can be stored and compared against any future donations by the same donor.

Screening for Contaminants

The milk is then tested for pathogens. The milk may be genetically screened, e.g., by polymerase chain reaction (PCR), to identify, e.g., viruses, such as HIV-1, HBV and HCV. A microorganism panel that screens for various bacterial species, fungus and mold via culture may also be used to detect contaminants. For example, a microorganism panel may test for aerobic count, *Bacillius cereus, Escherichia coli, Salmonella, Pseudomonas*, coliforms, *Staphylococcus aureus*, yeast and mold. In particular, *B. cereus* is a pathogenic bacterium that cannot be removed through pasteurization. Pathogen screening may be performed both before and after pasteurization.

In addition to screening for pathogens, the donor milk may also be tested for drugs of abuse (e.g., cocaine, opiates, synthetic opioids (e.g. oxycodone/oxymorphone) methamphetamines, benzodiazepine, amphetamines, and THC) and/or adulterants such as non-human proteins. For example, an ELISA may be used to test the milk for a non-human protein, such as bovine proteins, to ensure, e.g., that cow milk or cow milk infant formula has not been added to the human milk, for example to increase donation volume when donors are compensated for donations.

Processing Human Milk

Once the human milk has been screened, it is processed to produce a high fat product, e.g., a human cream composition. The donation facility and milk processing facility can be the same or different facility. Processing of milk can be carried out with large volumes of human milk, e.g., about 75 liters/lot to about 2,000 liters/lot of starting material.

Methods of obtaining compositions that include lipids from human milk to provide nutrition to patients are described in PCT Application PCT/US07/86973 filed on Dec. 10, 2007 (WO 2008/073888), the contents of which are incorporated herein in their entirety.

After the human milk is carefully analyzed for both identification purposes and to avoid contamination as described above, the milk then undergoes filtering, e.g., through about a 200 micron filter, and heat treatment. For example, the composition can be treated at about 63° C. or greater for about 30 minutes or more. Next, the milk is transferred to a separator, e.g., a centrifuge, to separate the cream (i.e., the fat portion) from the skim. The skim can be transferred into a second processing tank where it remains at about 2 to 8° C. until a filtration step. Optionally, the cream separated from the skim, can undergo separation again to remove more skim.

Following the separation of cream and skim, the skim portion undergoes further filtration, e.g., ultrafiltration. This process concentrates the nutrients in the skim milk by filtering out the water. The water obtained during the concentration is referred to as the permeate. The resulting skim portion can be further processed to produce human milk fortifiers and/or standardized human milk formulations.

Processing of human milk to obtain human milk fortifiers (e.g., PROLACTPLUS™ Human Milk Fortifiers, e.g., PROLACT+4™, PROLACT+6™, PROLACT+8™, and/or PROLACT+10™, which are produced from human milk and contain various concentrations of nutritional components) and the compositions of the fortifiers are described in U.S. patent application Ser. No. 11/947,580, filed on Nov. 29, 2007, (U.S. 2008/0124430) the contents of which are incorporated herein in their entirety. These fortifiers can be added to the milk of a nursing mother to enhance the nutritional content of the milk for, e.g., a preterm infant.

Methods of obtaining standardized human milk formulations (exemplified by PROLACT20™, NEO20™, and/or PROLACT24) and formulations themselves are also discussed in U.S. patent application Ser. No. 11/947,580, filed on Nov. 29, 2007, (U.S. 2008/0124430) the contents of which are incorporated herein in their entirety. These standardized human milk formulations can be used to feed, e.g., preterm infants. They provide a nutritional human-derived formulation and can substitute for mother's milk.

Formulating Human Cream Compositions

Once the cream portion has been separated from the skim portion, the caloric content of the cream portion is measured. In one preferred embodiment, if the caloric content or the percentage of fat of the cream portion is above a desired level, a volume of the permeate from the ultrafiltration of the skim portion may be added to the cream portion, thereby providing a formulated human cream composition that has the desired caloric content. Alternatively, in another preferred embodiment, deionized water may be added to the cream portion in order to provide the formulated human cream composition. For example, the desired caloric content of the human cream composition is about 2.0 kcal to about 3.0 kcal or more per ml. In a preferred embodiment, the desired caloric content is about 2.5 kcal/ml. In another example, the desired percentage of fat of the human cream composition is about 20% to about 30% or more lipids. In certain embodiments, the desired percentage of fat is about 25% lipids.

Packaging and Pasteurization

After optionally adding permeate or deionized water to the cream, the cream composition undergoes pasteurization. For example, the composition can be placed in a process tank that is connected to the high-temperature, short-time (HTST) pasteurizer via platinum-cured silastic tubing. After pasteurization, the cream composition can be collected into a second process tank and cooled. Other methods of pasteurization known in the art can be used. For example, in vat pasteurization the cream composition in the tank is heated to a minimum of 63° C. and held at that temperature for a minimum of thirty minutes. The air above the cream composition is steam heated to at least three degrees Celsius above the cream composition temperature. In one embodiment, the product temperature is about 66° C. or greater, the air temperature above the product is about 69° C. or greater, and the product is pasteurized for about 30 minutes or longer. In another embodiment, both HTST and vat pasteurization are performed.

The pasteurized cream composition is generally processed aseptically. After cooling to about 2 to 8° C., the product is filled into containers of desired volumes, and various samples of the cream composition are taken for nutritional and bioburden analysis. The nutritional analysis ensures proper calorie and fat content of the cream composition. A label that reflects the nutritional analysis is generated for each container. The bioburden analysis tests for presence of contaminants, e.g., total aerobic count, *B. cereus, E. coli, Coliform, Pseudomonas, Salmonella, Staphylococcus,* yeast, and/or mold. Bioburden testing can be genetic testing. The product is packaged and shipped once the analysis is complete and desired results are obtained.

In one embodiment, the resultant human cream composition comprises about 2.0 kcal to about 3.0 kcal or more per ml. In a preferred embodiment, the human cream composition comprises about 2.5 kcal/ml. It is contemplated that the resultant human cream composition comprises about 20% to about 30% or more fat. In one embodiment, the human cream composition is about 25% fat.

Use of Human Cream Compositions

The human cream compositions described herein may be used as supplemental nutrition. Accordingly, the human cream compositions described herein may be administered enterally or orally (e.g., bottle feeding). The use of human lipids for parenteral nutrition, a practice of intravenous feeding (e.g., total parenteral nutrition), for a patient in need thereof is described in PCT Application PCT/US07/86973 filed on Dec. 10, 2007 (WO 2008/073888), the contents of which are incorporated herein in their entirety.

The disclosed human cream compositions are particularly useful for supplementing human milk for infants, especially LBW infants, in order to raise the caloric content of the human milk to a desired level. Human milk is often administered enterally to preterm infants in the NICU. Enteral nutrition is a practice of tube feeding, e.g., nasogastric, transpyloric, and percutaneous. Human milk (e.g., mother's own or donor) often does not meet the caloric requirements of a LBW infant (Wocjik et al. *J Am Diet Assoc,* 109:137-140, 2009). Therefore, in one embodiment, the human cream composition of the current invention is added to the human milk, thereby increasing the caloric content while also maintaining the entirely human milk diet of the infant and avoiding the complications associated with TPN. In one embodiment, the enteral nutrition comprising the human cream composition is for a preterm or LBW infant.

In one embodiment, a method of increasing the caloric content of human milk to a desired caloric content level is provided. The method comprises the steps of obtaining a sample of human milk (e.g., mother's own or donor or pool of milk derived from the mother and/or donors), measuring the caloric content of the human milk, determining a volume of a human milk cream composition needed to raise the caloric content of the human milk to the desired caloric content level, and adding the volume of the human milk cream composition to the container of human milk. For example, the desired caloric content is 20 kcal/oz or more. In another embodiment, the desired calorie target is 24 kcal/oz or more. In another embodiment, the desired calorie target is 26 kcal/oz or more. The human milk cream composition used to increase the caloric content of the human milk may comprise, e.g., about 2.5 kcal/ml and/or about 25% fat.

In some instances, it may be desirable to reduce the amount of human milk that the human cream composition is added to in order to keep the total volume administered or fed to the infant the same. For example, an equal volume of human milk may be removed prior to the addition of the cream composition.

All documents cited herein are expressly incorporated by reference in their entireties for all purposes.

EXAMPLES

The following examples are intended to illustrate but not limit the disclosure.

Example 1

Standardized Human Milk Cream Product

In order to provide a nutritional supplement that can add the desired amounts of calories to mother's own or donor milk without adding a significant amount of volume, a human cream composition was produced that can be delivered enterally, thereby avoiding the negative effects associated with TPN. Human milk from previously screened and approved donors was mixed together to generate a pool of donor milk. In a clean room environment, the pool of donor milk was further tested for specific pathogens and bovine proteins. Specifically, PCR testing was used to screen for the presence of HIV-1, HBV, and HCV in the milk. A microbiological panel was also performed that tests for, e.g., aerobic count, *Bacillius cereus, Escherichia coli, Salmonella, Pseudomonas*, coliforms, *Staphylococcus aureus*, yeast and mold.

The pool of donor milk was ultracentrifuged to generate a cream portion and a skim milk portion. The cream portion was then formulated to meet specific fat and calorie specifications by adding an amount of the water ultra-filtered from the skim portion, the human skim milk ultrafiltration permeate. Specifically, the cream portion was standardized to 25% lipids and contained about 2.5 kcal/ml.

The standardized cream composition was then pasteurized following guidance set by the FDA's Pasteurized Milk Ordinance. Following pasteurization, the standardized cream composition was then filled into high density polyethylene bottles and frozen. The bottles were weighed to ensure that the intended volume was filled into the bottle. The bottled cream composition was then quarantined until all data from the microbiological panel was reviewed and a full nutritional analysis was performed.

The bottled cream composition was labeled with a lot specific "use by" date and product lot number. The cream product was then shipped frozen to the destination, e.g., hospital, in an insulated cooler packed with dry ice.

Example 2

Enteral Administration of Human Milk Cream Product to VLBW Infants

In order to evaluate the short-term effect of the use of a human cream composition, Prolact CR™, to supplement low caloric content human milk for very low birth weight (VLBW) neonates, human milk comprising less than 20 kcal/oz was supplemented with the human cream in addition to a human milk fortifier (Prolact+H²MF®)(i.e., the cream adjusted milk arm or treatment arm) or with the human milk fortifier without a human cream supplement (i.e., the non-adjusted milk am or control group).

Seventy eight pre-term infants were randomized into either the cream supplement group or the control group that did not receive the human cream supplement. Each study group used the human milk-based fortifier Prolact+H²MF® according to the standard of practice. Typically fortification begins when the infant receives up to about 100 ml/kg/day of enteral nutrition. Milk for the cream test group was supplemented with the human cream composition after fortification began and was determined to be tolerated, usually one day later.

The actual daily feeding amounts during the study were not controlled, with the exception of the human cream composition which was given in an amount to achieve a caloric level of mother's milk/donor milk of 20 kcal/oz where necessary. The use of the fortifier, both the timing of initiation and stepping protocol, were determined according to local standard of care.

This study was designed to evaluate a null hypothesis of inferior results with respect to the rate of weight gain between the two study groups using the following formulas where n is the mean rate of weight gain in the respective study group:

$$H_0: \mu_{cream} - \mu_{no\ cream} \leq -3 \text{ g/kg/day and } H_a: \mu_{cream} - \mu_{no\ cream} > -3 \text{ g/kg/day}.$$

Data were also collected on the rate of change of head circumference and body length. However, these were tested based on the usual superiority paradigm. The rate of weight gain for any infant that did not complete the full study period was calculated over the period for which the infant remained in the study.

The study subjects were followed until the first of the following periods: 36 weeks corrected gestational age or weaned from fortification, whichever came first; discharge; transfer from the medical institution; or death. Corrected gestational age was calculated as gestational age at birth+ chronological age.

The study subjects were selected based on a series of inclusion and exclusion criteria. All study subjects met all of the inclusion criteria and none of the exclusion criteria listed below. The five inclusion criteria were as follows:
1. Birth weight between 750 and 1250 g
2. Have a reasonable expectation of survival for the maximum duration of the study (through 36 weeks corrected gestational age or weaned from fortification, whichever came first)
3. Must be able to adhere to a feeding protocol involving mother's own milk/donor milk that will include fortification using Prolact+H²MF® and, potentially, human cream
4. Enteral feeding must begin before the $21^{st}$ day of life
5. Informed consent obtained from parent or legal guardian.

The eight exclusion criteria were as follows:
1. Less than a reasonable expectation of survival for the infant's particular gestational age through the study period
2. Enrolled in any other clinical study affecting nutritional management during the study period
3. Decision to not start minimum enteral feed before day 21 of life
4. Unable to obtain informed consent from parent or legal guardian prior to the initiation of enteral feeding
5. Presence of clinically significant congenital heart disease
6. Presence of any major congenital malformations
7. Reasonable potential for early transfer to non-study institution
8. Unable to participate for any reason based on the decision of the study investigator.

After eligibility of the infant was determined and informed consent was obtained from the parent or legal guardian, infants were randomized using a stratified (by study site) block scheme into either the test group that received the human cream supplement or the control group that did not receive the human cream supplement. All other nutrition (e.g., human milk and Prolact+H²MF®) was provided in the same fashion and according to institutional standard practice for both study groups.

The randomization was performed in blocks of 4 without the use of stratification variables except for study site because of the small study size. Block size was kept blinded. While blinding of study groups is always desirable in randomized studies, because of the nature of the interventions, e.g., the need to test the human milk in only one group and the methods by which the nutrition was prepared and delivered, it was not possible for this study.

The number of infants included in this study was based first on the primary endpoint of the rate of weight gain over the period of the initiation of enteral feeding through 36 weeks corrected gestational age or when the infant was weaned from fortification, whichever came first. A study of human milk and Prolact+H²MF® by Sullivan et al. (*J Pediatrics*, 156:562-567, 2010) demonstrated a standard deviation of weight gain of 4 g/kg/day. The goal of the trial was to show a lack of inferiority in the mean weight gain for the cream test group when compared to the control group. Lack of inferiority has been defined as a difference of weight gain of less than 3 g/kg/day. With a 1-sided 5% significance level and 90% power, the study required 31 subjects per group (62 total) in order to demonstrate the lack of inferiority hypothesis. However, it was anticipated that for some infants in the cream group, their human milk (e.g., mother's or donor) may never fall below 20 kcal/oz based on data from Wojcik et al. (*J Am Diet Assoc*, 109:137-140, 2009) that demonstrated this might occur as much as 25% of the time. As a result, the sample size for the cream test group was increased by about 25% to 39 subjects, and the control group was also increased to keep the study balanced. The resulting total sample size was 78 subjects. The cream test group was an intent-to-treat (ITT) group in spite of the fact that some of the infants may not receive the cream supplement.

Once human milk fortification was initiated and tolerance was established based on clinical observation, the human milk was tested each time a new container of human milk was used to prepare feedings. The caloric content of the human milk was measured using a commercially available device (the Unity SpectraStar near infrared spectrometer) provided for this purpose. Each time the caloric content of the human milk for an infant in the cream test group fell below 20 kcal/oz, the volume of the human cream composition needed to bring the caloric content as close as possible to 20 kcal/oz was determined. The amount to be added was calculated to the nearest ml by rounding down for 0.1-0.4 ml and rounding up for 0.5-0.9 ml in order to avoid imprecision due to the calorie measuring device used in the nutrition preparation area. Prior to adding the calculated volume of the cream composition, an equal volume of human milk was removed from the container, thereby maintaining the same total volume. The calorie-adjusted, if required, human milk and subsequent Prolact+H²MF® was then provided according to institutional standard care. The infants randomized into the control group were provided the human milk and Prolact+H²MF® according to the institutional standard of care without any use of the milk analysis, as is typical for the vast majority of neonatal intensive care units.

The nutritional algorithm was continued until the infant reached 36 weeks corrected gestational age or was weaned from the fortifier, whichever came first, or was otherwise removed from the study (e.g., due to transfer to a non-study institution, removal from the study, or death). Results are listed below in table 1.

Data collection forms were provided in order to capture the relevant information indicated below. As noted above, the primary measure of efficacy for this study was the rate of change of weight from the initiation of enteral feeding through 36 weeks corrected gestational age or weaning from the fortifier, whichever came first. Based on the ITT paradigm defined above, the rate of change of weight was determined for the period of time in the study for any subject that failed to complete the study period for any reason. In order to provide a valid comparison between the study subjects, the rate of weight gain was reported as g/kg/day. Any subject that failed to complete the study period was dropped from any calculations with respect to this primary endpoint.

At study entry, the following variables were recorded: birth weight, gestational age, gender, Apgar score at 5 minutes, use of mechanical ventilation, use of prenatal or postnatal steroids, and the age in days at which enteral feeding was initiated. In addition, the presence of any of the following clinical conditions either at the time of study entry or occurring during the course of the study were noted: transient tachypnea of newborn (TTN), intraventricular hemorrhage (IVH), and patent ductus arteriosus (PDA).

Head circumference increment for the study period and length increment for the study period were determined Length and head circumference were measured on a weekly basis during the study period and recorded as cm/week. The use of medications that influence growth and development, including postnatal steroids (e.g., hydrocortisone and dexamethasone), caffeine and other methylxanthine preparations were also recorded.

The daily amount of all enteral nutrition was recorded in units of ml. This quantity was subdivided into the various types of nutrition used, i.e., mother's milk, donor milk, cream supplement, Prolact+H²MF®, and any other nutritional support. In the event of feeding intolerance or discontinuation of enteral feeding and the infant returning to total parenteral nutrition (TPN), the assumed cause was identified. In addition, the total number of days of TPN was recorded for the study period.

Although not a focus of this study, occurrences of sepsis, necrotizing enterocolitis (NEC) and other related infectious outcomes were recorded. In addition, basic demographic and medical information on each subject was collected and recorded. These variables included gestational age, birth weight (including whether the birth weight was appropriate for gestational age (AGA) or small for gestational age (SGA) based on standard criteria), gender, and racial group.

The results of the study indicated that infants in the cream test group grew at a faster pace with respect to weight, and length when compared to the control group clearly demonstrating the superior efficacy of the claimed products compared to current feeding protocols.

Table 1 is a summary of the growth parameter velocities defined over the study period for the 78 patients in the study. There were no differences in baseline demographics except race (p=0.02). There were no cases of NEC and no differences in the rates of sepsis between study groups. The one-sided 95% lower bound of the confidence interval for the difference in mean velocity (cream-control) in terms of g/kg/day was 0.38. This was well above the value of −3 indicated as a definition of lack of inferiority.

TABLE 1

| Parameter | Cream Group (n = 39) | Control Group (p = 39) | p-value (Two-sample t-test with allowance for unequal variances) |
|---|---|---|---|
| Length velocity (cm/wk) | 1.03 ± 0.33 | 0.83 ± 0.41 | 0.02 |
| Head Velocity (cm/wk) | 0.90 ± 0.19 | 0.84 ± 0.22 | 0.21 |
| Weight Velocity (g/day) | 19.8 ± 5.1 | 17.1 ± 6.4 | 0.045 |
| Weight Velocity (g/kg/day) | 14.0 ± 2.5 | 12.4 ± 3.9 | 0.03 |

Table 2 shows the growth velocities defined from birth and from the time to regain birth weight

| Parameter | Cream group (n = 39) | Control group (n = 39) | p-value (Wilcoxon rank-sum test) |
|---|---|---|---|
| Length velocity from birth (cm/wk) | 0.95 ± 0.34 | 0.76 ± 0.29 | 0.01 |
| Head velocity from birth (cm/wk) | 0.64 ± 0.19 | 0.62 ± 0.21 | 0.58 |
| Weight velocity from birth (g/day) | 16.5 ± 4.6 | 14.6 ± 5.7 | 0.19 |
| Weight velocity from birth (g/kg/day) | 11.4 ± 2.1 | 10.3 ± 3.4 | 0.11 |
| Weight velocity calculated from time infant regained birthweight (g/day) | 21.8 ± 5.4 | 18.6 ± 6.4 | 0.02 |
| Weight velocity calculated from time infant regained birthweight (g/kg/day) | 15.7 ± 2.5 | 13.7 ± 4.0 | 0.02 |

What is claimed is:

1. An enteral human milk cream composition comprising pasteurized human milk cream derived from pooled human milk, wherein the composition comprises about 2.5 kcal/ml and about 25% fat.

2. The human cream composition of claim 1, further comprising human skim milk permeate.

3. The human cream composition of claim 1, further comprising deionized water.

* * * * *

UNITED STATES PATENT AND TRADEMARK OFFICE
CERTIFICATE OF CORRECTION

PATENT NO. : 11,122,813 B2
APPLICATION NO. : 14/198432
DATED : September 21, 2021
INVENTOR(S) : Elster et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 86 days.

Signed and Sealed this
Twenty-fifth Day of February, 2025

Coke Morgan Stewart
*Acting Director of the United States Patent and Trademark Office*